Aug. 16, 1966   A. K. CHITAYAT   3,266,393
MEANS AND METHODS FOR MARKING FILM

Filed June 19, 1963   2 Sheets-Sheet 1

*INVENTOR.*
ANWAR K. CHITAYAT
BY *James P. Malone*

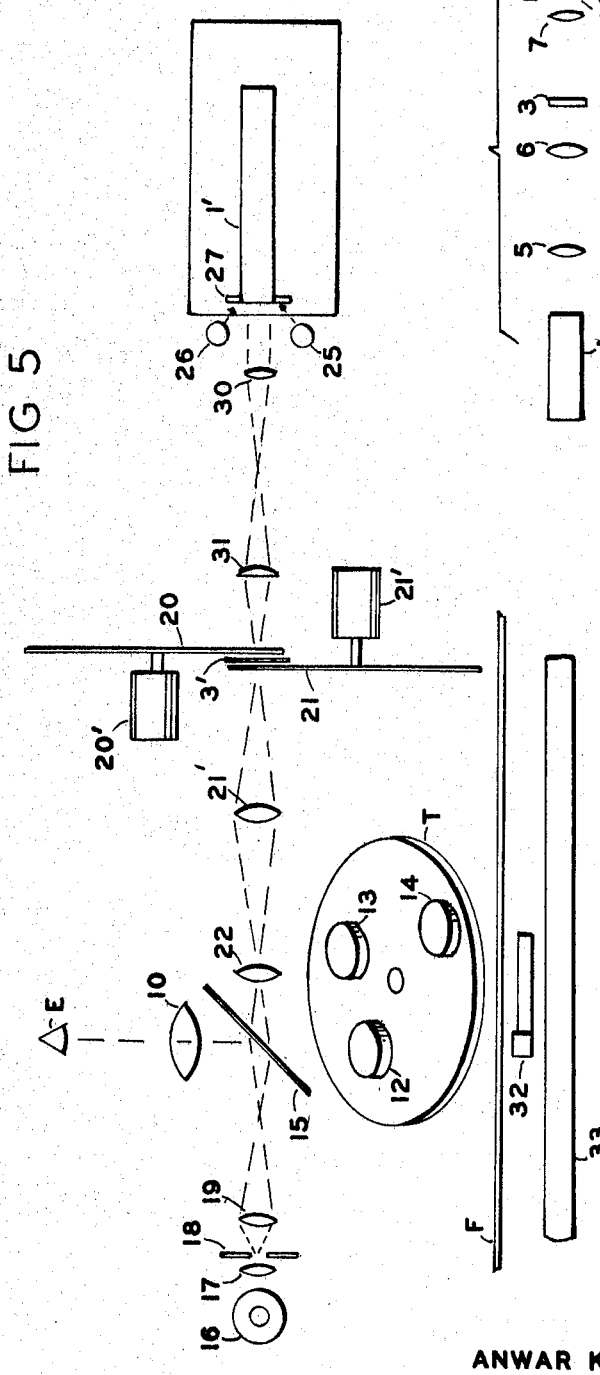

United States Patent Office 3,266,393
Reissued Aug. 16, 1966

3,266,393
MEANS AND METHODS FOR MARKING FILM
Anwar K. Chitayat, Plainview, N.Y., assignor to OPTO-mechanisms, Inc., Plainview, N.Y.
Filed June 19, 1963, Ser. No. 289,115
3 Claims. (Cl. 95—1.1)

This invention relates to means and methods for marking film and more particularly to such means utilizing radiant energy.

It is frequently desirable to mark points on film for instance, in the evaluation of aircraft reconnaissance film or for photographic mapping. It is desirable to do this optically in order to achieve greater accuracy and flexibility. It is also desirable that the markings be projectable and preferably desirable that the markings may be seen with the naked eye or through a microscope.

The general technique of the present invention is to mark the film with characteristic marking shapes such as a circle or a cross, by means of a radiant energy beam which effects the film emulsion or a deposited dye. The radiant energy beam source may be a laser. The laser beam may pass through a reticle in order to form the beam into the shape desired and the beam is then impinged upon the emulsion side of the film. The radiant energy causes some of the emulsion or dye to vaporize or be otherwise removed or displaced making a clear mark for instance a circle or a cross where it is desired to mark on the film. The laser beam is pulsed when it is desired to mark the film so that the radiant energy is not dissipated to the adjacent areas resulting in very sharp well defined marks. The addition of lenses in the beam path enhances the operation by focusing the image from a well defined reticle onto the film.

Accordingly, a principal object of the invention is to provide a new and improved film marking means.

Another object of the invention is to provide new and improved film marking means without moving parts.

Another object of the invention is to provide new and improved film marking means which makes marks on the film and which are projectable.

Another object of the invention is to provide new and improved film marking means utilizing a radiant beam.

Another object of the invention is to provide new and improved film marking means utilizing laser beam.

Another object of the invention is to provide new and improved film making means utilizing laser beam, a reticle to form the beam and means to hold film in front of the reticle.

Another object of the invention is to provide new and improved film marking means comprising a radiant energy beam and means to form the beam on film.

Another object of the invention is to provide new and improved means for marking film without any mechanical touching of the film.

These and other objects of the invention will be apparent from the following specification and drawings of which:

FIGURE 5 is a schematic view of another embodiment of the invention utilized in a film viewer.

FIGURE 6 is a schematic view of another embodiment of the invention utilized in a film viewer.

Figure 1:
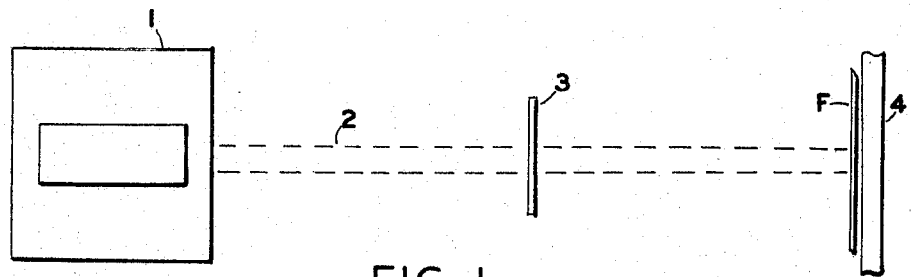
FIGURES 1 and 2 are schematic views of embodiments of the invention.

Referring to FIGURE 1, the invention generally comprises, a means 1 to provide the beam 2 of radiant energy, a reticle 3 placed in front of said beam source and means 4 to hold the film F. The radiant energy beam source may be a laser as will be described. The laser is pulsed with a very short pulse to make a mark on the film. The process of making the mark causes some of the emulsion of the film to be affected where the beam impinges upon the film. This causes evaporation and reorientation of the silver emulsion.

Figure 2:
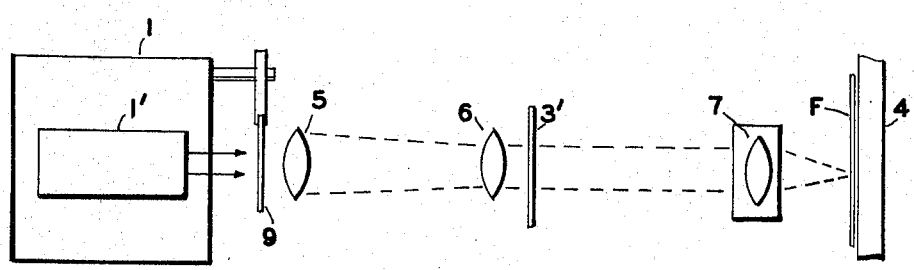

FIGURE 2 shows a slightly modified version of the invention. Beam source 1 may comprise a laser 1'. A reticle 3' is placed between the beam source and a film holder 4 for holding the film F. In front of the beam source 1 is placed a light gathering lens 5 and in front of the light gathering lens is a field lens 6. In front of the film is placed an objective lens 7 in order to focus the beam upon the film. The focusing of the beam, of the embodiment of FIGURE 2, permits somewhat greater accuracy and efficiency than the embodiment of FIGURE 1. If desired, a filter 9 may be placed in front of laser 1 to control the beam intensity.

The filter is not a color filter but may be used to control the beam intensity since it is rather difficult to control the laser beam intensity electrically.

Figure 3:
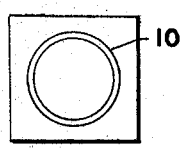
FIGURES 3 and 4 are elevation views of typical reticles.
Figure 4:
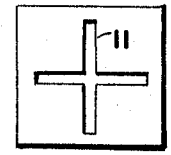

FIGURES 3 and 4 show typical reticle shapes. FIGURE 3 shows a reticle having a circular aperture 10 and FIGURE 4 shows a reticle having a cross shape aperture 11. The article may be manufactured as a metal deposited on glass, by photographic process, or machined or engraved onto a thin sheet of metal.

FIGURE 5 shows an embodiment of the invention used in a viewing system. The film F is adapted to be viewed by the eye E of operator through the lens 10. The film is illuminated through the other side by means of the lights 32 and 33. Different magnification lenses 12, 13, and 14 may be provided on a turret T.

A beam splitter 15 is mounted between the magnification lens 12 and the field lens 10. The purpose of the beam splitter is to provide means for applying identification marks on the film.

The lamp 16, lens 17, iris 18 and lens 19 in combination serve to project an illuminated dot onto the film so that the operator may line up the film to the exact point which he wishes to mark. The marking beam is provided by means of the beam source 1' which may be a laser. The laser 1' beam passes through the light gathering lenses 30 and 31 and then through the reticle 3' and discs 20 and 21 which may be motor operated by the motors 20' and 21'. The purpose of the discs is to provide a plurality of identification marks for instance, a series of numbers or letters which may be placed upon the film. After the laser beam passes through the reticle and discs it passes through the lens 21 and 22 thereby impinging upon the beam splitter 15 and then is projected onto the film.

Means are also provided for projecting an illuminated mark so that the film may be accurately located before the permanent laser marking is made. This means comprises the lamps 25 and 26 which pass light to the diffusion element 27, mounted around the end of the laser and through the same path that the laser beam takes unto the film. This results in an illuminated marking showing up on the film on exactly the place where the permanent marking will be and this arrangement permits very great accuracy to be obtained.

The exit pulse from the laser is directed by light gathering lenses 30 and 31 onto the marking apertures 20 and 21. The purpose of these lenses is to assure uniform distribution of energy onto the reticles independent of the distribution of illumination from the ruby rod. The image of the reticles are displaced onto the film planes after passing through a relay lens 21' which images the illumination at the field lens 22 which is then focused by the objective lens 12 onto the film F.

The design of the optical system provides for large size reticles in order to distribute the laser energy over a large area so that the reticles are not overheated. In addition, the illumination is distributed to fill the aperture of the lenses in order not to concentrate the heat over a small area. Consequently, high reliability may be achieved. Since a large size reticle (magnified by 20× from the film) is used, the edge gradients may be limited to 1 micron.

In order to provide a quick means for looking at the image of the marking reticle on the film prior to actuating the laser, two small filament lamps 25 and 26 illuminate a diffusing disc 27 surrounding the laser rod. This illumination is then passed through the marking reticles, and can then be observed at the film plane. In this manner, the operator merely actuates an auxiliary switch at will in order to observe the identification mark.

The point marking reticle is contained within a fixed reticle holder. A preferable shape may be a reticle of a donut shape of outer diameter 40 microns and inner diameter of 25 microns.

The point marking reticle may be also a donut shape surrounding the point of .060″ inner diameter and .070″ outer diameter. This aperture may be included on the same point marking reticle shown above. Within this dual reticle two spaces are provided so that the image of two numbers can be passed through.

The numbers are located on metal evaporated glass discs 20 and 21 one on each side of the reticle. The evaporated surfaces are located next to the reticle to minimize the amount of defocus. However, optimum focus caused at the numbers only increases the line width of the numbers very slightly, without effecting its legibility. The location of the numbers may be within the circle, so that each number may be .050″ high. In addition, recording the numbers in digital form as dots is possible. In any event, the arrangement described above gives a high degree of flexibility since the discs and reticle can be interchanged.

Each number disc preferably contains 12 positions: 10 numbers, a blank area and open area. Selection of any position is achieved by a switch at the control panel which automatically indexes the stepping motors 20′ and 21′.

FIGURE 6 illustrates the utilization of inks or dyes for marking. Prior to the radiation of the laser pulse, the general vicinity of the film to be marked is sprayed from a spray jet 34, or applied by a liquid applicator. Thus, if the size of the mark is 0.050″ in diameter, then a slightly larger area (approximately 0.060″ in diameter) is sprayed. The laser beam is actuated after the film is sprayed. The type of spray or dye may be one of the following:

(1) The spray layer may be made of transparent film of thermally affected spray. Then, if radiation energy is impinged on the film and is absorbed by the film, the film would change color so that it appears black, grey, or having a particular color. The remaining area where the laser beam is not applied, remains transparent, or may evaporate in time. Consequently, only the shape of the mark determined by the reticle 3′ is marked on the film.

(2) The spray may be made of transparent magnetic ink. The area effected by the laser beam must be larger than the applied spray. Then, the laser beam is made to effect at all areas except at the position where the mark is to be applied. Consequently, all areas except at location of the mark is evaporated and the magnetic ink remains at the predetermined shape selected by the reticle 3′. The advantage of utilizing magnetic ink is to allow the utilization of an electronic lock device to track the mark. The utilization of the magnetic mark achieves a high signal-to-noise ratio, since the film itself is not magnetic, and it is easier to trace a magnetic mark than a visual mark on the film.

(3) The type of dye used may be ultra-violet sensitive and applied as illustrated in item (1) above. Consequently, the mark may easily be distinguishable by using ultra-violet energy.

Once the film is marked by means of the present invention, it will be quite easy to scan the film optically to find the marked points. Sufficiently large marking points may be used which may be found with the naked eye without any magnification.

The optical design for point marking is shown in FIGURE 2, which includes all the design requirements established by the tests discussed herein.

The laser pulse energy is approximately 1½ joules with a threshold energy of 0.3 joule. The power supplies and laser are conventional and include the controls for the viewer. Control of the output energy of the power supplies is preferably provided to allow initial optimization by the operator. The laser head itself is small, 6 inches diameter x 8 inches long, which can be located at the outer edges of the objective head.

An interlocking system with fail-safe features may be provided so that when the laser is actuated, a solenoid is first actuated to shutter any of the illumination to reach the eye of the operator. If these solenoids are not actuated, the laser cannot be energized.

*Alignment of illuminated dot reticle to identification reticle*

The design of the optical system, FIGURE 5, assures that alignment, once it is set, is maintained after extended usage. It may be noted that the same beam splitter 15 directs the illumination from the projected dot onto the eyepiece and directs the laser beam to the film plane. Any misalignment of the beam splitter effects both reticles in the same manner. The objective lens system is mounted on a turret T with precision stops, so that when the high magnification objective lens is in operation, the turret stops at an exact position.

Provisions are preferably made so that the dot may be aligned to the marking reticle by energizing the separate illumination of the marking system. The operator may then observe if there is any discrepancy in alignment.

The design of the optical system is such that when the operator aligns the reticle to the point of interest on the film, he can check his alignment of the marks if he desires. He then pushes the "laser pulse" button 11. The action of the laser is completely electronic. No mirrors or optics have to be displaced. Consequently, there is no possibility of jarring the objective to get it out of alignment.

*Laser experimentation tests*

In order to determine the feasibility of film indentification by lasers, several tests were conducted. The purpose of the tests was to determine the following:

(1) Power required by the lasers to produce an identification mark.

(2) Effects of film density on the legibility or type of mark on film.

(3) Effects of different types of emulsion or film base.

(4) The minimum size of mark, its contrast and its inside uniformity.

(5) Type of optical system required to assure of alignment and to achieve optimum performance.

FIGURE 2 illustrates the optical schematic of the test setup. Two ruby laser heads were utilized: the first had a maximum laser energy output of 0.1 joule. Both utilized a power supply with a maximum discharge of 500 joules. The time of lasing action was 500 microseconds. The output wavelength is 6943 Angstroms.

The optical system, FIGURE 2, contained a light gathering lens 5 which collected the illumination from the laser allowing it to be concentrated onto a metalized reticle 3. The image of the reticle is then focused by a microscope objective lens 7 onto the film F plane. The objective was a 10 power Leitz microscope objective. The light gathering lens assures that all the illumination leaving the reticles is gathered by the objective.

Furthermore, defocus is provided at the reticle to assure an approximate energy distribution across the reticle, independent of the non-uniform output illumination from the ruby rod. The illumination at the reticle is defocused in order to provide filling of the eyepiece lens at different angles in order to assure that the numerical aperture of the lens is matched to the entrance illumination. In this manner, essentially diffraction limited optics can be utilized at their optimum performance.

The type of reticles used are shown in FIGURES 3 and 4.

The size of the spot on the film was varied by defocusing the reticle No. 1; the resultant energy requirement for a full spot of .010″ diameter is listed below:

Film density: 2.0 or larger—0.002 joule.
Film density: 0.3 or larger—0.020 joule.

The above figures have shown adequate contrast, as shown by dark-well defined edges. The test reticle was reproduced exceptionally well. Thus, one shot of the laser left a very easily identifiable mark with dark edges; illumination was then placed behind the reticle imaging the reticle onto the mark. These two images were found to be hardly distinguishable in size and shape, indicating faithful reproduction of the reduced target at the film.

A sample aerial film was tested at several portions (density 2.5 approximately) and the light portion (0.15 approximately). Permanent marks were formed with easily identifiable contrast.

The following conclusions were made from the tests:

(1) The required energy is 0.02 joule per square for .010″ x .010″ or 1 joule per 0.07″ area.

(2) Lines as narrow as .001″ were easily formed with sharp edges. Maximum gradient light to dark was approximately 2½ microns. It must be clarified here that sharper lines were not expected since the resolution of the lens and test setup was not much better than the results shown above, as indicated by utilizing only a low magnification (10×) between a machined reticle and the film.

(3) Different types of film were marked, with resultant similar marks on each film. No observable variation of performance was noted.

(4) In order to achieve a notable mark on the film, it is necessary that at least a density of 0.15 shall be present on the film, otherwise excessive energy is required to leave an easily identifiable mark. The reason for this was attributed to the fact that some silver must be present at the emulsion in order to gather the energy from the laser. Otherwise, almost all the red light is transmitted through the film without effecting it.

The above conclusion is not considered as a limitation to the system, since normally processed aerial film, or any other practical film, has minimum density ($D_{min}$), at a higher level than 0.15. Consequently, for all practical purposes, any film can be identified by a laser without an additional dye.

(5) By observing aerial film with identification laser marks, a circle of .020″ diameter was easily observed by looking at the film directly. However, a cross of .010″ is slightly more difficult to locate by the naked eye, even though every one of several personnel could locate the position of the (.001″ x .01″) mark with the naked eye. It may be concluded from the above that a circle of .20″ is adequate. However, it may be preferable to utilize an identification locating mark such as a donut circle .60″ in diameter, or another mark of different shape, but the same size. It is then possible to visibly locate the mark easily by directly viewing the film with the naked eye.

(6) The utilization of a ruby laser with a red light is adequate for film identification. The gradient change of maximum contrast within 2 microns is proven possible by the tests. However, further reduction of the gradient so that total contrast change can occur within one micron may require the following:

(a) The reticle must be sharply defined and sharply focused.

(b) The energy must be set so that it does not highly exceed that required to identify the mark. However, the tests did indicate that the setting is not critical. A ratio of energy of 10:1 did not seem to produce a noticeably different gradient. As much as 100:1 increase in energy seems to deteriorate the gradient slightly. Since this setting is not critical, a manual dark and light setting by the operator is probably satisfactory. Thus, if the density is large, above 1.5, the operator merely pushes a lever which inserts a filter 9 in the laser light path to reduce the energy. Since this setting is not critical, the operator does not have to guess at the exact value of density, but merely observes whether it is a light or dark area. Another possible method of controlling the energy is by electrically reducing the output of the flash tubes by the adjustable setting available at the laser power supply. An automatic reduction of power when the density is large can be achieved simply in the following manner. A cadmium sulfide cell is located to read the central average illumination so that if the film area is very dark, a relay is automatically actuated to reduce the power of the laser. The reduction of power may be achieved by the addition of a resistor through a relay to the capacitor discharge circuit of the laser. The above power reduction may not be necessary if a slight gradient can be tolerated.

(7) Good uniformity is achieved with a straight line or a donut. In the latter case, the diameter is uniform. The line weight is 10 microns; the edge gradient is sharp. It is believed that the edge gradient of 2 microns can be achieved. However, the reduction of edge gradient to 1 micron is not known at this time without actual system tests.

(8) Investigations were made to indicate if film, chemicals or silver particles are evaporated so that the gases or particles can then rise and deposit on the objective lens. An inspection indicated that no observable fumes or gases can be observed after the laser shot. Furthermore, the objective lens was inspected after approximately 30 laser pulses to determine if any accumulation of deposits are noted on the lens. The results showed that no effects were noticeable. The above results, however, did not determine conclusively the minimum number of pulses without effecting lens performance, but it did indicate that a very large number of identification marks can be made without deteriorating the lens.

(9) Film was placed between glass plates to determine if film identification can be made when it is completely enclosed within glass. The laser marking action did not seem to be effected by these conditions. However, it was noted that only when an excessive energy was concentrated on the film, 100 times more than is needed, marks could also be seen on the glass plate next to the emulsion. This might be caused by the evaporation of particles that adhere to the glass plates. However, it was found on the glass plate on the side of the base further from the emulsion. Thus, even though excessive energy was concentrated at the film, the glass plate next to the base was not effected.

The above results were expected, since the base of the film is essentially transparent to red light and is not directly heated by the laser. Consequently, it was concluded that a most reliable system can be developed where the base of the film is directly placed against a vacuum glass plate. The upper portion of the film, emulsion side, is directly exposed to air; above which is located the objective lens. No glass is then located between the emulsion and objective achieving optimum optical performance, and eliminating the direct contact of emulsion and glass.

(10) In order to prevent the laser pulse from eventually overheating or deteriorating the lens, a large aperture objective must be used at which the laser pulses are uniformly distributed. In this manner, no excessive heating can be located at any portion of the lens. The above is especially necessary in the event of dust particles being accumulated at the lower surface of the objective. Furthermore, the reticle should be as large as possible, with as high demagnification as possible to the film plane, so that the energy per unit area is minimum at the reticle. The defocusing lens design utilized in the experiment proved adequate, since no deterioration was observed at the reticle or lenses.

The lenses are necessary to form the laser beam. The laser beam is narrow, as a matter of fact it is too narrow for a practical size reticle. Furthermore, the laser beam is non-uniform in intensity. Therefore, the beam must be formed and made uniform. Furthermore, the reticle should be as large as possible, so that the beam must be enlarged to cover the reticle and at the same time provide minimum heat effect on the reticle.

Thereafter, the beam must be formed on the film plane with as high demagnification as possible to the film plane, so that the energy per unit area is minimum at the reticle. The beam must also be collimated to make it uniform in intensity and to fully cover the lens apertures with minimum heat on the lens. If the lenses are not properly illuminated, they are liable to be burnt by the high energy content of the beam especially if a beam does not cover the full aperture and if the beam is not made uniform in intensity. This problem is important in practice.

The purpose of the applicant's device is to place very small marks on film, for instance on aerial reconnaissance film to mark various objectives. To provide small size, lenses are needed to converge and focus the beam from the large size reticle.

Another modification is to use a colored dye that can be sprayed on the film, or can be mechanically contacted onto the film. The laser is then flashed so that the heat or light pulse evaporates everything except the identification mark. The film is then provided with the mark only. The color of the dye can be any color such as black. It can be an ultra-violet sensitive dye so that it fluoresces when the ultra-violet energy impinges on the film. In this manner, the only position of the film that is bright is the mark which can easily be observed. Alternatively, a magnetic material may be placed on the film and vaporized by the beam or a heat sensitive material can be used so that it changes color upon application of the beam.

The magnetic ink is used only to make a mark which may be electrically tracked on the film. It does not have any special coaction with the laser beam. It would be vaporized just like any other ink dye or emulsion. The ink need not be magnetic. The only advantage of the magnetic ink is that the marks may be sensed by magnetic pickups.

Many modifications may be made by those who desire to practice the invention without departing from the scope thereof which is defined by the following claims.

I claim:

1. Means to place identification marks on film comprising:
   a laser,
   means to pulse said laser,
   a reticle placed in front of said laser,
   means to hold film in front of said reticle,
   and means located adjacent said film to place a transparent dye on said film, said dye being responsive to said laser energy to place a mark on said film.

2. Means to place identification marks on film comprising:
   a laser,
   a reticle placed in front of said laser,
   means to hold film in front of said reticle,
   and means located adjacent said film to place a transparent magnetic dye on said film, said dye being responsive to said laser energy to place a mark on said film.

3. Vaporization means to place identification indicia on photographic film comprising, means located adjacent said film to place dye on said film
   a pulsed laser,
   a movable reticle having a plurality of shaped indicia openings therein, mounted in the laser beam path,
   first lens means between the said laser and said reticle to form the laser beam to illuminate the entire selected indicia on the reticle with a uniform intensity beam,
   a beam splitter mounted in said beam path after said reticle,
   second lens means in said beam path adapted to focus the image from said reticle to said beam splitter,
   a third lens means in said beam path mounted under said beam splitter and adapted to receive reflections from said beam splitter and adapted to receive indicia images from said reticle and focus them on said film, to vaporize a portion of said dye, said portion being shaped correspondingly to said shaped reticle indicia opening.

References Cited by the Examiner

UNITED STATES PATENTS

| | | | |
|---|---|---|---|
| 1,649,621 | 11/1927 | Slocum | 95—1.1 |
| 2,384,666 | 9/1945 | Wood | 95—1.1 X |
| 2,478,545 | 8/1949 | Pearce | 95—11 |
| 2,566,509 | 9/1951 | Albright | 95—1.1 X |
| 2,941,462 | 6/1960 | Berg | 95—1.1 X |
| 3,125,936 | 3/1964 | Abell | 95—1.1 |

OTHER REFERENCES

Book, "Masers and Lasers," Hogg et al., published by Maser and Laser Associates, July 1962, p. 175.

Book, "Masers and Lasers," published by Technology Markets, May 1962, p. 54.

JOHN M. HORAN, *Primary Examiner.*